UNITED STATES PATENT OFFICE.

JOSEPH A. AMBLER, OF NORWICH, CONNECTICUT, AND HARRY D. GIBBS, OF SAN FRANCISCO, CALIFORNIA.

PROCESS FOR THE MANUFACTURE OF NAPHTHALENE SULFONIC ACIDS.

1,390,241.  Specification of Letters Patent.  Patented Sept. 6, 1921.

No Drawing.  Application filed January 26, 1918. Serial No. 213,978.

(FILED UNDER THE ACT OF MARCH 3, 1883, 22 STAT. L., 625.)

*To all whom it may concern:*

Be it known that we, JOSEPH A. AMBLER and HARRY D. GIBBS, citizens of the United States of America, employees of the Department of Agriculture of the said United States, residing, respectively, in the city of Norwich, county of New London, State of Connecticut, and in the city of San Francisco, county of San Francisco, State of California, (whose post-office address is Washington, D. C.,) have jointly invented a new and useful Process for the Manufacture of Naphthalene Sulfonic Acids.

This application is made under the act of March 3, 1883, chapter 143 (22 Stat. 625), and the invention herein described and claimed may be used by the Government of the United States or any of its officers or employees in the prosecution of work for the Government, or any person in the United States, without payment to us of any royalty thereon.

Heretofore various methods for manufacturing the sulfonic acids of naphthalene have been employed, among which are the following:

(1) By adding the naphthalene to sulfuric acid, or to sulfuric acid containing sulfur trioxid, under suitable temperature control and with various methods of agitation and mixing.

(2) By adding the sulfuric acid to the heated, molten naphthalene, with the proper temperature control and stirring devices.

It is well known that the product formed when naphthalene is sulfonated depends on the temperature of the reaction, the strength of the acid and the duration of the heating, and that prolonged heating of the product with the sulfuric acid present often causes the initial products to be transformed into isomeric acids; as, for example, when naphthalene is disulfonated at 180° the product is a mixture of the isomeric naphthalene 2–7 and 2–6 disulfonic acids. If the duration of the heating is short, the naphthalene 2–7 disulfonic acid predominates, whereas if the mixture is heated for a long time this sulfonic acid undergoes transformation into the isomeric naphthalene 2–6 disulfonic acid, a change which is more or less complete depending on the length of time of heating.

We have found that when naphthalene is sulfonated in the gaseous state and the product removed rapidly from the reaction vessel, much less sulfuric acid is necessary for sulfonation and the transformation into isomeric sulfonic acids is largely prevented.

We shall illustrate our invention by describing the process for the manufacture of naphthalene 2–7 disulfonic acid, although the invention is not restricted to this particular sulfonic acid.

Procedure 1. Sulfuric acid of specific gravity 1.84 is caused to descend over baffle-plates, pebbles or coarse pumice stones, in a tower, which is heated and maintained at a temperature of 220° to 230° centigrade. Naphthalene is heated to boiling and its vapors are passed up through the tower. The vapors come into contact with the descending hot sulfuric acid and are completely absorbed by it, with the formation of water and naphthalene disulfonic acids. The water escapes from the tower as steam and may be condensed in any suitable condenser attached at or near the top of the tower. The sulfonic acids, together with a slight excess of unused sulfuric acid, are carried downward by means of gravity, and discharged from the bottom of the tower. Thus they are subjected to the heat of the tower only for the brief interval of their fall through the portion of the tower below the place of their formation, and hence the transformation into isomeric acids is largely prevented. The small amount of the isomeric naphthalene 2–6 disulfonic acid which is formed is easily separated from the valuable naphthalene 2–7 disulfonic acid by well known means.

Procedure 2. Sulfonation may also be carried out at reduced pressure. When the same procedure hereinbefore described is carried out at the pressure of 185 mm. of mercury, the naphthalene boils at approximately 162° C. and its vapors rise through the descending current of sulfuric acid which is heated and maintained at 200° C. The products of the reaction move in a similar manner as in procedure 1. The apparatus must of course be fitted with suitable means of maintaining the said partial vacuum and allow for the continual removal of the products.

Thus our invention is an improvement on existing methods of manufacture of naphthalene sulfonic acids, in that it is a continuous process and the products move in a continuous and automatic manner; also in that said products are removed rapidly from the influence of heat and thus are less liable to undergo secondary transformation into less valuable isomeric sulfonic acids; and also in that less sulfuric acid is required for the process.

It is obvious that other concentrations of sulfuric acid than that having specific gravity 1.84 may be used, that other temperatures than those hereinbefore mentioned may be used, that other pressures than those hereinbefore specified may be used and that other acids than naphthalene 2-7 disulfonic acid may be manufactured by this method, and our invention is not restricted to such sulfuric acid, temperatures, pressures or naphthalene sulfonic acid, but has a general application to the sulfonation of naphthalene in the gaseous state.

Having thus described our invention, we claim—

1. A continuous process for the manufacture of sulfonic acids of naphthalene by causing the vapors of naphthalene to come into contact with a descending current of sulfuric acid.

2. A continuous process for the manufacture of sulfonic acids of naphthalene by causing the vapors of naphthalene to come into contact with a descending current of sulfuric acid, heated and maintained at the temperature at which naphthalene boils.

3. A continuous process for the manufacture of sulfonic acids of naphthalene by causing the vapors of naphthalene to come into contact with a descending current of sulfuric acid, heated and maintained at a temperature above that at which naphthalene boils.

4. A continuous process for the manufacture of sulfonic acids of naphthalene by causing the vapors of naphthalene to rise through a tower in which a stream of sulfuric acid is descending over obstructions to break and retard its fall.

5. A continuous process for the manufacture of sulfonic acids of naphthalene by causing the vapors of naphthalene to rise through a tower in which a stream of sulfuric acid, heated and maintained at the temperature at which naphthalene boils, is descending over obstructions to break and retard its fall.

6. A continuous process for the manufacture of sulfonic acids of naphthalene by causing the vapors of naphthalene to rise through a tower in which a stream of sulfuric acid, heated and maintained at a temperature above that at which naphthalene boils, is descending over obstructions to break and retard its fall.

7. A continuous process for the manufacture of naphthalene 2-7 disulfonic acid by causing the vapors of naphthalene to rise through a tower in which a stream of sulfuric acid, heated and maintained at the temperature at which naphthalene boils, is descending over obstructions to break and retard its fall.

8. A continuous process for the manufacture of naphthalene 2-7 disulfonic acid by causing the vapors of naphthalene to rise through a tower in which a stream of sulfuric acid, heated and maintained at a temperature above that at which naphthalene boils, is descending over obstructions to break and retard its fall.

9. A continuous process for the manufacture of naphthalene 2-7 disulfonic acid by causing the vapors of naphthalene to rise through a tower in which a stream of sulfuric acid, heated and maintained at the temperature at which naphthalene boils, is descending over obstructions to break and retard its fall, the heating being continued for such a length of time as to effect transformation of naphthalene 2-7 disulfonic acid first produced into naphthalene 2-6-disulfonic acid.

10. A continuous process for the manufacture of naphthalene 2-6 disulfonic acid by causing the vapors of naphthalene to rise through a tower in which a stream of sulfuric acid, heated and maintained at a temperature above that at which naphthalene boils, is descending over obstructions to break and retard its fall, the heating being continued for such a length of time as to effect transformation of naphthalene 2-7-disulfonic acid first produced into naphthalene 2-6-disulfonic acid.

11. A continuous process for the manufacture of sulfonic acids of naphthalene by causing the vapors of naphthalene to rise through a tower in which a partial vacuum is maintained while a stream of sulfuric acid, heated and maintained at the temperature at which naphthalene boils in said partial vacuum, is descending over obstructions to break and retard its fall.

In testimony whereof, we affix our signature in the presence of two subscribing witnesses.

JOSEPH A. AMBLER.
HARRY D. GIBBS.

Witnesses:
L. A. SKINNER,
R. HELLBACH.